(12) United States Patent
Wu et al.

(10) Patent No.: US 11,637,707 B2
(45) Date of Patent: *Apr. 25, 2023

(54) SYSTEM AND METHOD FOR MANAGING INSTALLATION OF AN APPLICATION PACKAGE REQUIRING HIGH-RISK PERMISSION ACCESS

(71) Applicant: Huawei International Pte. Ltd., Singapore (SG)

(72) Inventors: Yongzheng Wu, Singapore (SG); Xuejun Wen, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 223 days.

This patent is subject to a terminal disclaimer.

(21) Appl. No.: 17/112,750

(22) Filed: Dec. 4, 2020

(65) Prior Publication Data
US 2021/0091963 A1    Mar. 25, 2021

Related U.S. Application Data

(63) Continuation of application No. 15/964,038, filed on Apr. 26, 2018, now Pat. No. 10,873,466, which is a
(Continued)

(51) Int. Cl.
*H04L 9/32*    (2006.01)
*G06F 21/62*    (2013.01)
(Continued)

(52) U.S. Cl.
CPC ............ *H04L 9/3247* (2013.01); *G06F 21/51* (2013.01); *G06F 21/629* (2013.01); *G06F 21/64* (2013.01);
(Continued)

(58) Field of Classification Search
CPC ... H04L 9/3247; H04L 9/3236; H04L 9/3268; H04L 63/0823; G06F 21/51;
(Continued)

(56) References Cited

U.S. PATENT DOCUMENTS 6,976,163 B1 *  12/2005  Hind ..................... G06F 21/572
                                                    713/1
8,589,691 B1    11/2013  Hackborn et al.
(Continued)

FOREIGN PATENT DOCUMENTS

CN         1965527 A       5/2007
CN       101969440 A       2/2011
(Continued)

OTHER PUBLICATIONS

Anonymous: "Permissions overview," Android Developers, Docs, Retrieved from the internet: https://developer.android.com/guide/topics/permissions/overview, on Nov. 25, 2019, total 16 pages.
(Continued)

*Primary Examiner* — Mohammad W Reza
(74) *Attorney, Agent, or Firm* — Leydig, Voit & Mayer, Ltd.

(57) ABSTRACT

This application discloses a mobile device and method for managing installation of an application package (APK) in the mobile device. The device receives an installation request for installing the APK. The device retrieves a permission certificate for the APK according to the installation request. The permission certificate includes a cryptographic signature. The device determines validity of the permission certificate by verifying the cryptographic signature included in the permission certificate using a permission certification public key provided by a manufacturer of the device. The permission certification public key is stored in the device. The installation of the APK in the device is
(Continued)

allowed when the permission certificate is determined to be valid. Using the method, the APK requires the device to grant specific high-risk permissions to the application upon installation.

12 Claims, 6 Drawing Sheets

Related U.S. Application Data continuation of application No. PCT/SG2016/050539, filed on Nov. 3, 2016.

(51) Int. Cl.
*G06F 21/51* (2013.01)
*G06F 21/64* (2013.01)
*G06F 8/61* (2018.01)

(52) U.S. Cl.
CPC .......... *H04L 9/3236* (2013.01); *H04L 9/3268* (2013.01); *G06F 8/61* (2013.01); *G06F 2221/2141* (2013.01)

(58) Field of Classification Search
CPC .......... G06F 21/629; G06F 21/64; G06F 8/61; G06F 2221/2141; H04W 12/069; H04W 12/106; H04W 12/108; H04W 12/67; H04W 12/08; H04W 12/35
See application file for complete search history.

(56) References Cited

U.S. PATENT DOCUMENTS

| | | | |
|---|---|---|---|
| 8,763,080 | B2 | 6/2014 | Carrara et al. |
| 9,294,468 | B1* | 3/2016 | Kilbourn ............... H04L 9/3263 |
| 2005/0246523 | A1 | 11/2005 | Mauro, II et al. |
| 2006/0093149 | A1* | 5/2006 | Zhu .................... H04L 63/0442 |
| | | | 380/277 |
| 2006/0155986 | A1* | 7/2006 | Kleinhuis ............... G06F 21/51 |
| | | | 713/156 |
| 2009/0210702 | A1 | 8/2009 | Welingkar et al. |
| 2010/0287547 | A1* | 11/2010 | Korkishko ............ H04W 12/10 |
| | | | 717/177 |
| 2013/0160147 | A1 | 6/2013 | Draluk et al. |
| 2013/0254866 | A1 | 9/2013 | Koster et al. |
| 2014/0019955 | A1 | 1/2014 | Summerer |
| 2016/0054989 | A1 | 2/2016 | Diebolt et al. |

FOREIGN PATENT DOCUMENTS

| | | |
|---|---|---|
| CN | 102663320 A | 9/2012 |
| CN | 103248481 A | 8/2013 |
| CN | 103561006 A | 2/2014 |
| CN | 103778367 A | 5/2014 |
| CN | 103905207 A | 7/2014 |
| CN | 103944903 A | 7/2014 |
| WO | 2014000696 A1 | 1/2014 |

OTHER PUBLICATIONS

U.S. Appl. No. 15/964,038, filed Apr. 26, 2018.

* cited by examiner

SYSTEM AND METHOD FOR MANAGING INSTALLATION OF AN APPLICATION PACKAGE REQUIRING HIGH-RISK PERMISSION ACCESS

CROSS-REFERENCE TO RELATED APPLICATIONS

This application is a continuation of U.S. patent application Ser. No. 15/964,038, filed on Apr. 26, 2018, which is a continuation of International Application No. PCT/SG2016/050539, filed on Nov. 3, 2016. The International Application claims priority to Singapore Patent Application No. SG10201509221Y, filed on Nov. 6, 2015. All of the aforementioned patent applications are hereby incorporated by reference in their entireties.

TECHNICAL FIELD

Embodiments of this application relate to a system and method for managing installation of an Android™ application package (APK) in a device whereby the APK requires the device to grant specific high-risk permissions to the application upon installation.

BACKGROUND

Most software platforms or operating systems typically provide application programming interfaces (APIs) that each performs a particular function when called by applications of a software platform or an operating system. However, before the software platform allows for the invocation of the API requested by an application, the software platform will first determine whether the application has the required permission to invoke the API.

An operating system that utilizes such a permission architecture, which restricts what an installed application can do at run-time, would be the Android™ operating system. Before an application is installed in a device running the Android™ operating system, a list of permissions required by the application will be listed in the application's manifest file. During the installation of the application in the device, permissions requested by the application are verified and granted by a package installer in the device. The four basic permission types that may be granted by the Android™ operating system are "normal", "dangerous", "signature", and "signature/system".

The "normal" permission type is a low-risk permission that is usually granted by default to a requesting application. The "dangerous" permission type is a potentially high risk permission that may allow the requesting application access to the device's private data, e.g. messages, pictures, emails, or direct access to the device. As such, the device's package installer will typically require the device user to approve the granting of such permissions before the requested permissions are accorded to the requesting application during the installation process. The "signature" and the "signature/system" permission types are high risk permissions that require the application requesting the permission be signed with the Android™ system's signature. API's that may be invoked by "normal" or "dangerous" permissions types include, but are not limited to, receiving and sending of short-message-service (SMS) messages, retrieving global positioning system (GPS) coordinates, reading contacts, using the camera, retrieving photos, etc. API's that may only be invoked by "signature" or "signature/system" permission types include, but are not limited to, resetting of the device's settings to factory default, disabling communications, uninstalling other applications, etc.

Applications that are accorded with "normal" or "dangerous" types of permissions usually comprise of third party applications while applications that are granted "signature" or "signature/system" types of permissions usually comprise of system applications that are developed by the device's manufacturer. As such, applications that are classified as system applications are typically granted with all of the device's "signature" or "signature/system" types of permissions.

Presently, in Android™ operating systems, in order for a third party application to be accorded with high risk permissions, the developer of the third party application will first have to submit its application to be re-signed by the device manufacturer into a system application. When an application is re-signed, the application's original development key in the subject application is discarded and the subject application is then signed with the Android™ system key. After the third party application has been re-signed as a system application, the re-signed third party application will then be accorded with all the high-risk permissions. During the application's installation process, the Android™ system will recognize the re-signed application as a system application as the application's newly signed key now matches with the public key of the Android™ operating system. If the two keys are not the same, the application will instead be recognized as a third party application.

Once a third party application has been re-signed as a system application, this results in a third party application that has not only the required high-risk permissions, but also has all the signature/system type permissions that are typically assigned to system applications. This is disadvantageous as it violates the least-privilege principle. As such, this approach does not adequately address the situation whereby a third party application only requires a specific permission to access an API.

For the above reasons, those skilled in the art are constantly striving to come up with a system and method to manage the installation of an application, that belongs to a third party developer, in a device whereby the application that is to be installed requires high risk types of permissions such as system and/or signature/system type permissions.

SUMMARY OF THE INVENTION

The above and other problems are solved and an advance in the art is made by systems and methods provided by embodiments in accordance with the invention.

A first advantage of embodiments of systems and methods in accordance with the invention is that only specific predetermined permissions are granted to the application. Other system or signature/system level permissions that are not requested will not be automatically granted to the application.

A second advantage of embodiments of systems and methods in accordance with the invention is that high-risk permissions are only granted to a specific application as the issued permission certificate will only work with a specific application. This ensures that high-risk permissions that have been granted may not be misused or exploited by the developer of the application.

A third advantage of embodiments of systems and methods in accordance with the invention is that the permission certificate issued for an application may contain device identities meaning that the permission certificate may grant high-risk permissions to only a subset of devices and not all the devices belonging to a particular manufacturer.

A fourth advantage of embodiments of systems and methods in accordance with the invention is that the permission certificate may be embedded within the application package and retrieved during the installation process or the permission certificate may be downloaded from the device manufacturer's secure server during the application package's installation process.

The above advantages are provided by embodiments of a system in accordance with the invention operating in the following manner.

According to a first aspect, a method for managing an installation of an Android™ application package (APK) in a device is provided. The method includes the steps of receiving, by the device, an installation request for the APK; retrieving, by the device, a permission certificate for the APK according to the installation request, wherein the permission certificate for the APK includes a cryptographic signature; determining, by the device, a validity of the permission certificate by verifying the cryptographic signature included in the permission certificate using a permission certification public key of the manufacturer of the device, wherein the permission certification public key is stored in the device; and allowing the installation of the APK in the device if the permission certificate is determined to be valid.

With reference to the first aspect, in a first possible implementation manner of the first aspect, wherein preceding the step of allowing the installation of the APK in the device if the permission certificate is determined to be valid, the method further includes the step of: determining whether a permission request contained in the installation request corresponds to a permission granted in the permission certificate for the APK; and validating the permission certificate when it is determined that the permission request contained in the installation request corresponds to the permission granted in the permission certificate.

With reference to the first aspect or the first possible implementation manner of the first aspect, in a second possible implementation manner of the first aspect, the verifying the cryptographic signature included in the permission certificate includes: computing a cryptographic hash of the APK using a cryptographic hash function; and comparing the computed cryptographic hash of the APK with a cryptographic hash of the APK stored in the permission certificate.

With reference to the first aspect, the first possible implementation manner of the first aspect, or the second possible implementation manner of the first aspect, in a third possible implementation manner of the first aspect, the cryptographic signature included in the permission certificate is generated at a server associated with the manufacturer of the device when a permission certification private key of the manufacturer of the device is used to cryptographically sign the permission certificate for the APK.

With reference to the third possible implementation manner of the first aspect, in a fourth possible implementation manner of the first aspect, the cryptographically signed permission certificate for the APK includes the development public key of the APK, the name of the APK; the permission granted to the APK, and the validity period of the permission certificate.

With reference to the third possible implementation manner of the first aspect or the fourth possible implementation manner of the first aspect, in a fifth possible implementation manner of the first aspect, the permission certificate for the APK is cryptographically signed after the server receives a pre-release APK that contains a development permission certificate that has been cryptographically signed using the permission certification private key of the manufacturer of the device, and wherein the development permission certificate allows the pre-release APK to be installed in a predetermined development device.

With reference to the first aspect, or the first, second, third, fourth or fifth possible implementation manner of the first aspect, in a sixth possible implementation manner of the first aspect, the retrieving the permission certificate for the APK includes de-embedding the permission certificate from the APK.

With reference to the first aspect, or the first, second, third, fourth or fifth possible implementation manner of the first aspect, in a seventh possible implementation manner of the first aspect, the retrieving the permission certificate for the APK includes downloading the permission certificate from a remote server to the device.

BRIEF DESCRIPTION OF THE DRAWINGS

The above advantages and features in accordance with embodiments of this invention are described in the following detailed description and are shown in the following drawings in which.

DETAILED DESCRIPTION

Embodiments of this invention relate to a system and method for managing installation of an Android™ application package (APK) in a device whereby the APK requires the device to grant specific high-risk permissions to the application upon installation. More particularly, embodiments of this invention relate to a system and method that determines whether an APK, that requires access to protected Application Programming Interfaces (APIs), may be allowed to be installed in the device. Protected APIs refer to APIs that may only be invoked by applications that possess the required high-risk permissions.

Figure 1:
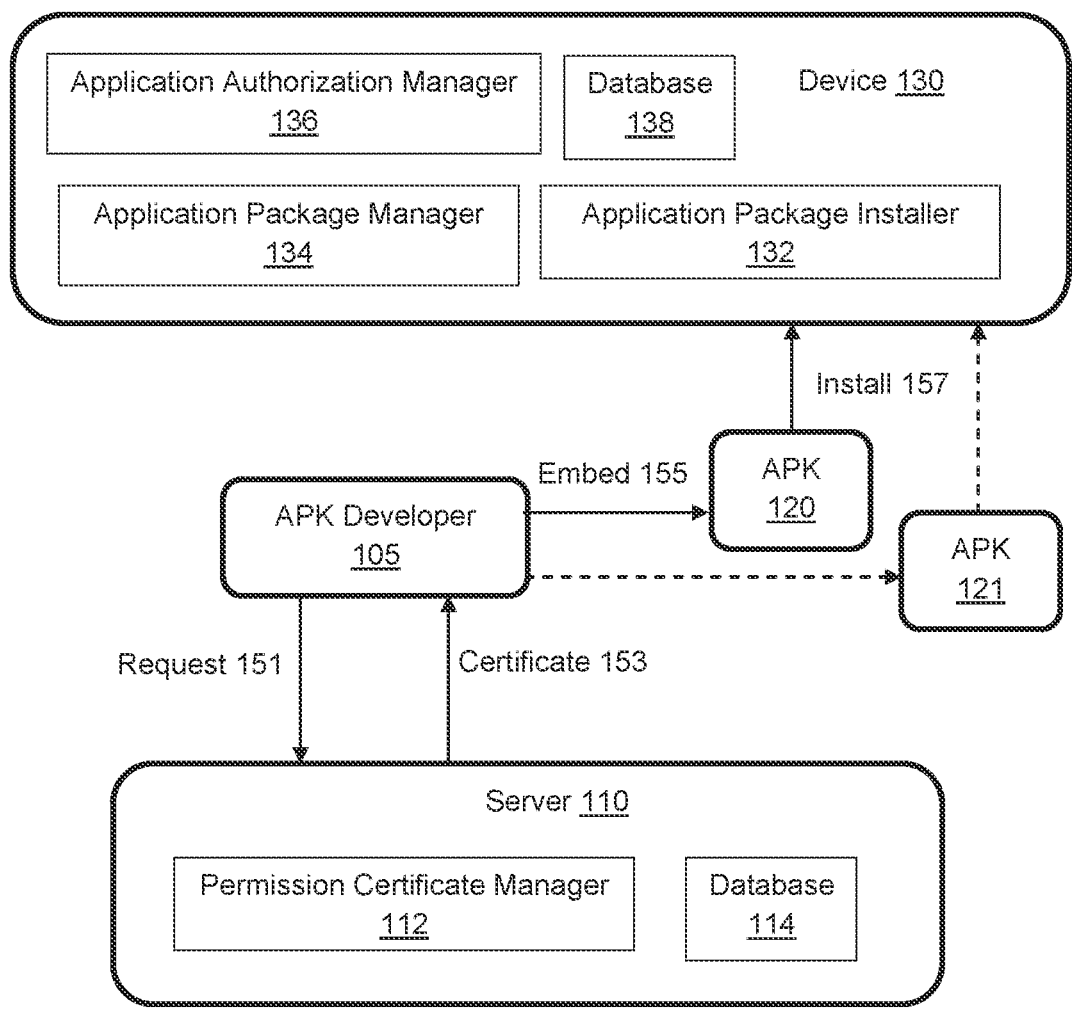
FIG. 1 illustrating a block diagram of a system for managing an installation of an application package (APK) in a device in accordance with an embodiment of the invention.

FIG. 1 illustrates a system for managing an installation of APK 120 or APK 121 in device 130 in accordance with an embodiment of the invention. Device 130 may comprise mobile devices such as, but not limited to, smartphones, tablet computers, portable computers and/or such computer systems. One skilled in the art will recognize that the software or function modules illustrated in FIG. 1, such as the modules in device 130 and server 110, may be written using development codes for such operating systems, or may be modified from existing classes or components coded for such operating systems to perform the processes required by each module as described below, and that data or information may be transferred between these modules as required.

The system illustrated in FIG. 1 operates in the following manner. APK developer 105 initiates the permission certificate granting process by first submitting request 151 to server 110. Server 110 may be a remote or a local server associated with, or belonging to, the manufacturer of device 130 and server 110 may be communicatively connected to APK developer 105 via wired or wireless connections. Request 151 will contain information such as the application's development public key, the application package's name, and the permission or permissions requested by the application. The permissions contained within request 151 may comprise of normal, dangerous, signature and/or signature/system type permissions. As mentioned previously, high-risk permissions refer to signature and/or signature/system type permissions that are usually only granted to system applications.

Upon receiving request 151, server 110 will analyze the contents of request 151 and based on the contents of the request 151, determine whether a permission certificate is to be issued to APK developer 105. If server 110 determines that a permission certificate is to be issued for APK developer 105, server 110 utilizes permission certificate manager 112 to generate a permission certificate based on the information provided within request 151. After the permission certificate has been generated, permission certificate manger 112 then retrieves a permission certification private key associated with the manufacturer of device 130 from database 114 and uses this private key to cryptographically sign the permission certificate to generate certificate 153. Server 110 then provides certificate 153 to APK developer 105. At this stage, it should be noted that certificate 153 includes the application's development public key, the application package's name, the permission or permissions requested by the application, a validity period of the permission certificate and a cryptographic signature.

APK developer 105 may then utilize certificate 153 to further develop its application. Once APK developer 105 is ready to release the application to the public, APK developer 105 may either embed certificate 153 into APK 120 at step embed 155 or APK developer 105 may upload certificate 153 into a remote server whereby certificate 153 may be downloaded at a later stage.

In the embodiment whereby certificate 153 is embedded into APK 120 at step 155, APK 120 with the embedded permission certificate 153 is then released to the public using the usual methods, e.g. via the various online application stores. To initiate the installation of APK 120 in device 130, device 130 will first have to submit a request to download APK 120 into device 130. Once this is done, the installation process of APK 120 in device 130 may then begin. When application package installer 132 receives a request to install APK 120 at step 157, application package installer 132 will utilize application package manager 134 to check if APK 120 contains requests for high-risk permissions or if APK 120 will invoke any protected APIs during run-time in device 130. If no high-risk permissions are requested or if no protected APIs will be invoked during run-time, application package manager 134 will proceed to grant the requested permissions to APK 120 using a standard component of the operating system, such as the Package Manager Service component.

If APK 120 includes requests for high-risk permissions or if APK 120 involves the invocation of protected APIs during run-time, application package manager 134 will notify application authorization manager 136 accordingly. Authorization manager 136 will then perform some checks on the content of APK 120 to determine whether the application should be accorded with the requested permissions. According to embodiments of the invention, the checks involve authorization manager 136 first retrieving a permission certification public key belonging to device 130 from database 138. The retrieved permission certification public key is a unique key that belongs to the manufacturer of device 130 and this unique key is also securely stored in database 138. Authorization manager 136 will then verify the permission certificate 153 using the retrieved permission certification public key of device 130. If the permission certificate 153 is determined to be valid, authorization manager 136 will then authorize application package manager 134 to proceed with the granting of the requested high-risk permissions to APK 120. The granting of the requested high-risk permissions may be done using a standard component of the operating system, such as the Package Manager Service component. Once this is done, application package installer 132 may then proceed with the installation of APK 120 in device 130 as normal. In accordance with a further embodiment of the invention, authorization manager 136 performs a verification check to determine whether the high-risk permission or high-risk permissions requested by APK 120 is contained within permission certificate 153. If authorization manager 136 determines that permission certificate 153 contains the requested permission or permissions, only then may application package installer 132 proceed with the installation of APK 120 in device 130.

In another embodiment of the invention whereby certificate 153 is not embedded into the APK at step 155, a version of the APK without permission certificate 153, i.e. APK 121, is released to the public using the usual methods, e.g. via the various online application stores. Similarly, to initiate the installation of APK 121 in device 130, device 130 will first have to submit a request to download APK 121 into device 130. Once this is done, the installation process of APK 121 in device 130 may then begin. When application package installer 132 receives a request to install APK 121 at step 157, application package installer 132 will first utilize application package manager 134 to check if APK 121 contains requests for high-risk permissions or if APK 121 will invoke any protected APIs during run-time in device 130. Similarly, if no high-risk permissions are requested or if no protected APIs will be invoked during run-time, application package manager 134 will proceed to grant the requested permissions to APK 121 using the default mechanisms.

Conversely, if APK 121 includes requests for high-risk permissions or if APK 121 involves the invocation of protected APIs during run-time, application package manager 134 will notify application authorization manager 136 accordingly. Before authorization manager 136 computes its own cryptographic signature of APK 121 using a retrieved permission certification private key of device 130, authorization manager 136 will first establish a secure connection with a server that contains a permission certificate associated with APK 121, i.e. certificate 153. One skilled in the art will recognize that this secure connection may comprise a wired or wireless connection and that the data transmitted may be encrypted using various encryption schemes known in the art. Once the secure connection has been established, authorization manager 136 will then download and store certificate 153 within database 138. If the download and storing of certificate 153 is successful, authorization manager 135 will then proceed to perform some checks using the content in certificate 153 to determine whether the application should be accorded with the requested permissions. The checks that may be performed are as previously described above.

Figure 2:
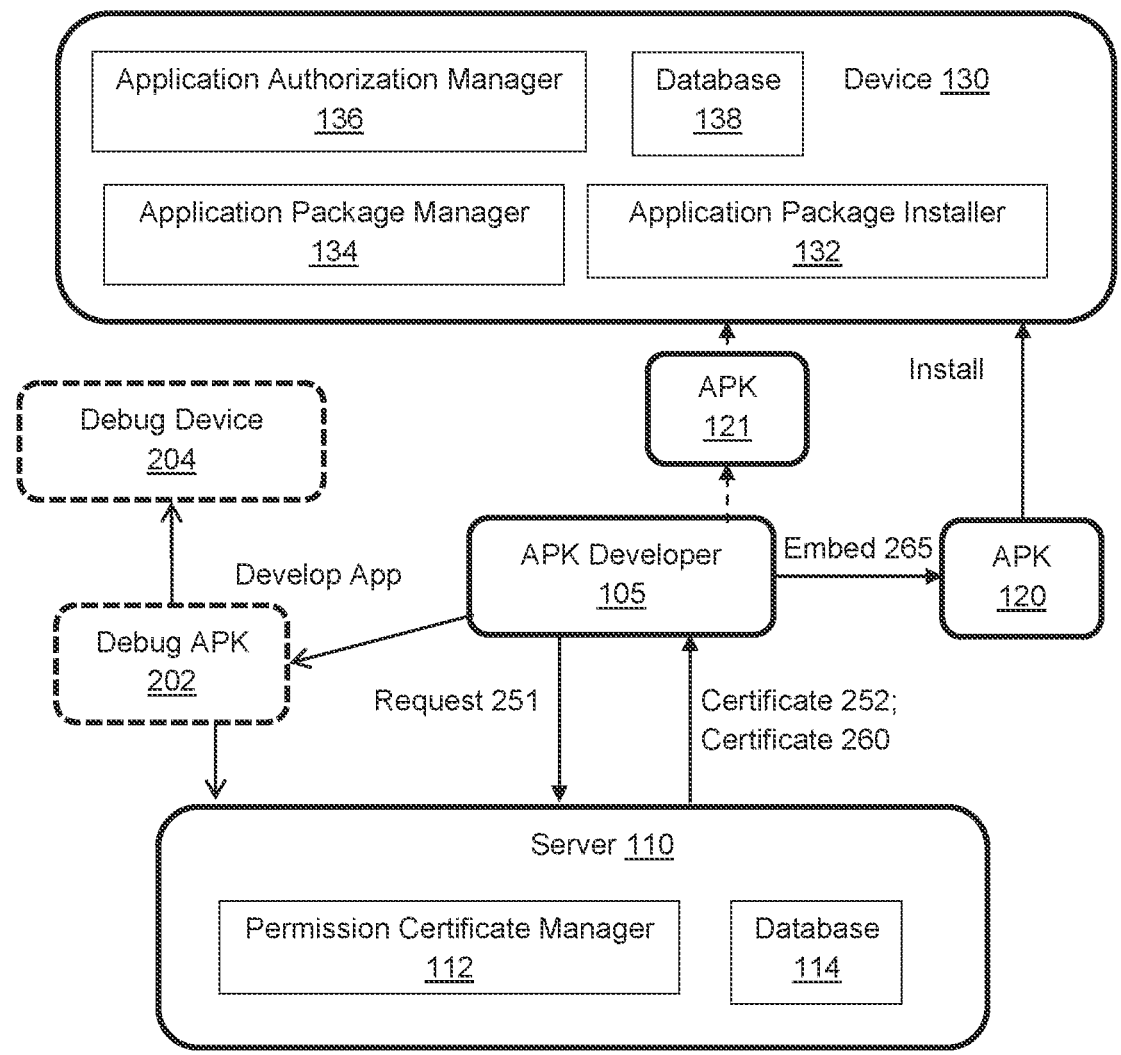
FIG. 2 illustrating a block diagram of a system for managing an installation of an application package (APK) in a device whereby a development permission certificate is issued prior to the issuance of a permission certificate in accordance with an embodiment of the invention.

FIG. 2 illustrates a block diagram of a system for managing an installation of APK 120 or APK 121 in device 130 whereby a development permission certificate is issued prior to the issuance of a permission certificate in accordance with another embodiment of the invention.

The system illustrated in FIG. 2 operates in the following manner. APK developer 105 initiates the permission certificate granting process by first submitting request 251 to server 110. Request 251 will also contain information such as the application's development public key, the application package's name, the permission or permissions requested by the application, and a list of device identities. The permissions contained within request 151 may comprise of normal, dangerous, signature and/or signature/system type permissions and the list of device identities sets out the devices for which the permission certificate may be used with.

Upon receiving request 251, server 110 will analyze the contents of request 251 and based on the contents of the request 251, determine whether a development permission certificate is to be issued to APK developer 105. If server 110 determines that a development permission certificate is to be issued for APK developer 105, server 110 utilizes permission certificate manager 112 to generate a development permission certificate based on the information provided within request 251. After the development permission certificate has been generated, permission certificate manager 112 then retrieves a permission certification private key associated with the manufacturer of device 130 from database 114 and uses this private key to cryptographically sign the development permission certificate to generate certificate 252. Server 110 then provides certificate 252 to APK developer 105. At this stage, it should be noted that certificate 252 includes the application's development public key, the application package's name, the permission or permissions requested by the application, a validity period of the permission certificate, the list of device identities and a cryptographic signature.

APK developer 105 may then utilize certificate 252 to further develop its application. During the development of the application, certificate 252 may be embedded into a developmental APK to produce debug APK 202. Debug APK 202 may then be installed in debug device 204. Debug device 204 is a developmental tool that is deployed by the application developer to test the installation of debug APK 202 and this tool contains the same functionalities as device 130. During the installation process of debug APK 202 in debug device 204, debug device 204 will perform some validation steps and checks to ensure that certificate 252 functions as required so that certificate 252 may be properly used for the validation of APK installations. It should be noted that debug APK 202 may only be installed in devices that are set out in the list of device identities whereby this list of device identities is included within certificate 252. In other words, debug device 204 has to be included in the list of device identities so that debug APK 202 may be installed in debug device 204.

After APK developer 105 has completed the development of the application, APK developer 105 will submit debug APK 202 to server 110 for auditing. Server 110 will check debug APK 202 for malicious or unwanted behavior and if server 110 is assured that debug APK is safe and complies with device 130 manufacturer's requirements, server 110 will then utilize permission certificate manager 112 to generate a release permission certificate for debug APK 202. Upon generation of the release permission certificate, permission certificate manager 112 will then retrieve a permission certification private key associated with the manufacturer of device 130 from database 114 and subsequently will use this private key to cryptographically sign the release permission certificate to generate certificate 260.

In embodiments of the invention, a cryptographic hash of one or more files in debug APK 202 is included into certificate 260. For example, a cryptographic hash of the "META-INF/MANIFEST.MF" file in debug APK 202 is included into certificate 260. One skilled in the art will recognize that the hash of other files may also be carried out without departing from certain embodiments of this invention. The purpose of generating a hash of content from debug APK 202 is to ensure that the issued certificate is tied to debug APK 202 and as such, may not be maliciously ported into other application packages instead.

Server 110 then provides certificate 260 to APK developer 105. At this stage, it should be noted that certificate 260 includes the application's development public key, the application package's name, the permission or permissions requested by the application, a validity period of the permission certificate, the cryptographic hash of the application package's content and a cryptographic signature.

Once APK developer 105 is ready to release the application to the public, APK developer 105 may either embed certificate 260 into APK 120 at step embed 265 or APK developer 105 may instead upload certificate 260 into a remote server whereby certificate 260 may be downloaded by device 130 at a later stage.

In the embodiment whereby certificate 260 is embedded into APK 120 at step 265, APK 120 with the embedded permission certificate 260 is then released to the public using the usual methods. To initiate the installation of APK 120 in device 130, device 130 will first have to submit a request to download APK 120 into device 130. Once this is done, the installation process of APK 120 in device 130 may then begin. As previously described, when application package installer 132 receives a request to install APK 120 at step 157, application package installer 132 will utilize application package manager 134 to check if APK 120 contains requests for high-risk permissions or if APK 120 will invoke any protected APIs during run-time in device 130. If APK 120 includes requests for high-risk permissions or if APK 120 involves the invocation of protected APIs during run-time, application package manager 134 will notify application authorization manager 136 accordingly. Authorization manager 135 will then perform some checks on the content of APK 120 to determine whether the application should be accorded with the requested permissions.

According to embodiments of the invention, the checks involve authorization manager 136 first retrieving a permission certification public key belonging to device 130 from database 138. Authorization manager 136 will then verify the permission certificate 260 using the retrieved permission certification public key of device 130. If permission certificate 260 is determined to be valid, authorization manager 136 will then authorize application package manager 134 to proceed with the granting of the requested high-risk permissions to APK 120. In accordance with a further embodiment of the invention, authorization manager 136 performs a verification check to determine whether the high-risk permission or high-risk permissions requested by APK 120 is contained within permission certificate 260. If authorization manager 136 determines that permission certificate 260 contains the requested permission or permissions, only then may application package installer 132 proceed with the installation of APK 120 in device 130.

According to another embodiment of the invention, authorization manager 136 will compute a cryptographic hash of APK 120's content to generate a hashed result. The hashed result as computed by authorization manager 136 is then compared with a hashed result of APK 120 as contained within permission certificate 260. If the hashed result of APK 120 as computed by authorization manager 136 matches with the hashed result of APK 120 as contained within permission certificate 260, this means that permission certificate 260 is determined to be valid and authorization manager 136 will then authorize application package manager 134 to proceed with the granting of the requested high-risk permissions to APK 120. Once the required permissions have been granted, application package installer 132 may then proceed with the installation of APK 120 in device 130 as normal.

In another embodiment of the invention whereby certificate 260 is not embedded into the APK at step 265, a version of the APK without permission certificate 260, i.e. APK 121, is released to the public using the usual methods. Similarly, to initiate the installation of APK 121 in device 130, device 130 will first have to submit a request to download APK 121 into device 130. Once this is done, the installation process of APK 121 in device 130 may then begin. When application package installer 132 receives a request to install APK 121 at step 157, application package installer 132 will first utilize application package manager 134 to check if APK 121 contains requests for high-risk permissions or if APK 121 will invoke any protected APIs during run-time in device 130.

If APK 121 includes requests for high-risk permissions or if APK 121 involves the invocation of protected APIs during run-time, application package manager 134 will notify application authorization manager 136 accordingly. Authorization manager 136 will first establish a secure connection with a server that contains a permission certificate associated with APK 121, i.e. certificate 260, to download and store certificate 260 within database 138. If the downloading and storing of certificate 260 is successful, authorization manager 135 will then proceed to perform some checks using the content in certificate 260 to determine whether the application should be accorded with the requested permissions.

According to embodiments of the invention, the checks involve authorization manager 136 first retrieving a permission certification public key belonging to device 130 from database 138. Authorization manager 136 will then verify permission certificate 260 using the retrieved permission certification public key of device 130. If permission certificate 260 is determined to be valid and authorization manager 136 will then authorize application package manager 134 to proceed with the granting of the requested high-risk permissions to APK 121. The granting of the requested high-risk permissions may be done using the default mechanisms and application package installer 132 may then proceed with the installation of APK 121 in device 130.

According to another embodiment of the invention, authorization manager 136 will compute a hash of APK 121's content to generate a hashed result. The hashed result as computed by authorization manager 136 is then compared with a hashed result of APK 121 as contained within permission certificate 260. If the hashed result of APK 121 as computed by authorization manager 136 matches with the hashed result of APK 121 as contained within permission certificate 260, the permission certificate 260 is determined to be valid and authorization manager 136 will then authorize application package manager 134 to proceed with the granting of the requested high-risk permissions to APK 121. Once the required permissions have been granted, application package installer 132 may then proceed with the installation of APK 121 in device 130.

In accordance with an embodiment of the invention, a method for managing an installation of an application package (APK) in a device wherein the APK invokes protected APIs during run-time comprises the following four steps:

Step 1: receiving, by the device, an installation request for the APK;

Step 2: retrieving, by the device, a permission certificate for the APK according to the installation request, wherein the permission certificate for the APK includes a cryptographic signature;

Step 3: determining, by the device, a validity of the permission certificate by verifying the cryptographic signature included in the permission certificate using a permission certification public key of the manufacturer of the device, wherein the permission certification public key is stored in the device; and Step 4: allowing the installation of the APK in the device if the permission certificate is determined to be valid.

In order to provide such a system or method, a process is needed for managing the installation of the Android™ application package (APK) in the device whereby the APK requires high-risk permissions to be granted during the installation process. The following description and FIGS. 3-5 describe embodiments of processes that provide processes in accordance with embodiments of this invention.

Figure 3:
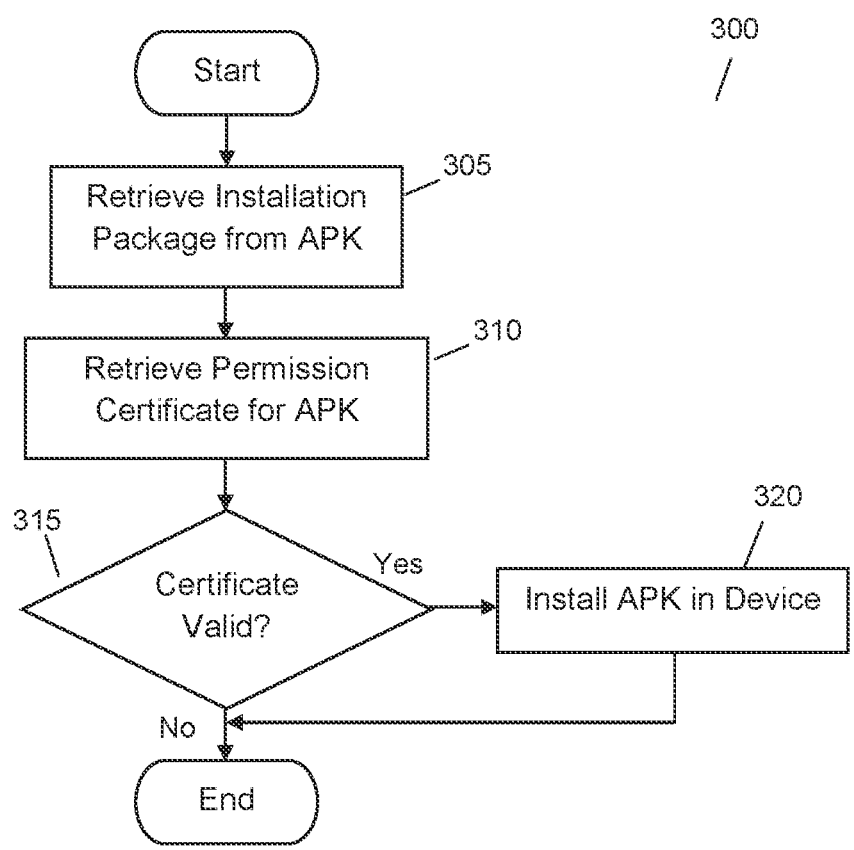
FIG. 3 illustrating a flow diagram of a process for managing an installation of an application package (APK) in a device in accordance with embodiments of the invention.

FIG. 3 illustrates process 300 that is performed by modules in a device to manage an installation of an Android™ application package (APK) in a device in accordance with embodiments of this invention. Process 300 begins in step 305 by retrieving an installation package from the APK. Process 300 then proceeds to retrieve a permission certificate for the APK at step 310. If the permission certificate is embedded in the APK, process 300 will de-embed the permission certificate from the APK else, if the permission certificate is stored in a remote server, process 300 will download the permission certificate from the remote server and store the downloaded permission certificate in the device. Process 300 then proceeds to check the validity of the certificate at step 315. In an embodiment of the invention, process 300 may check the validity of the permission certificate by verifying a cryptographic signature stored in the permission certificate with a permission certification public key of the manufacturer of the device. In another embodiment of the invention, process 300 may check the validity of the permission certificate by computing a cryptographic hash of the APK and matching the computed cryptographic hash of the APK with a cryptographic hash stored in the permission certificate. In both embodiments, if process 300 determines that there is a match, the permission certificate will be treated by process 300 as valid.

If process 300 determines that the certificate is valid, process 300 then proceeds to step 320. At step 320, process 300 proceeds to grant the requested high-risk permissions to the APK and then proceeds with the installation of the APK in the device. Alternatively, if process 300 determines at step 315 that the certificate is not valid, process 300 terminates the installation process and ends.

Figure 4:
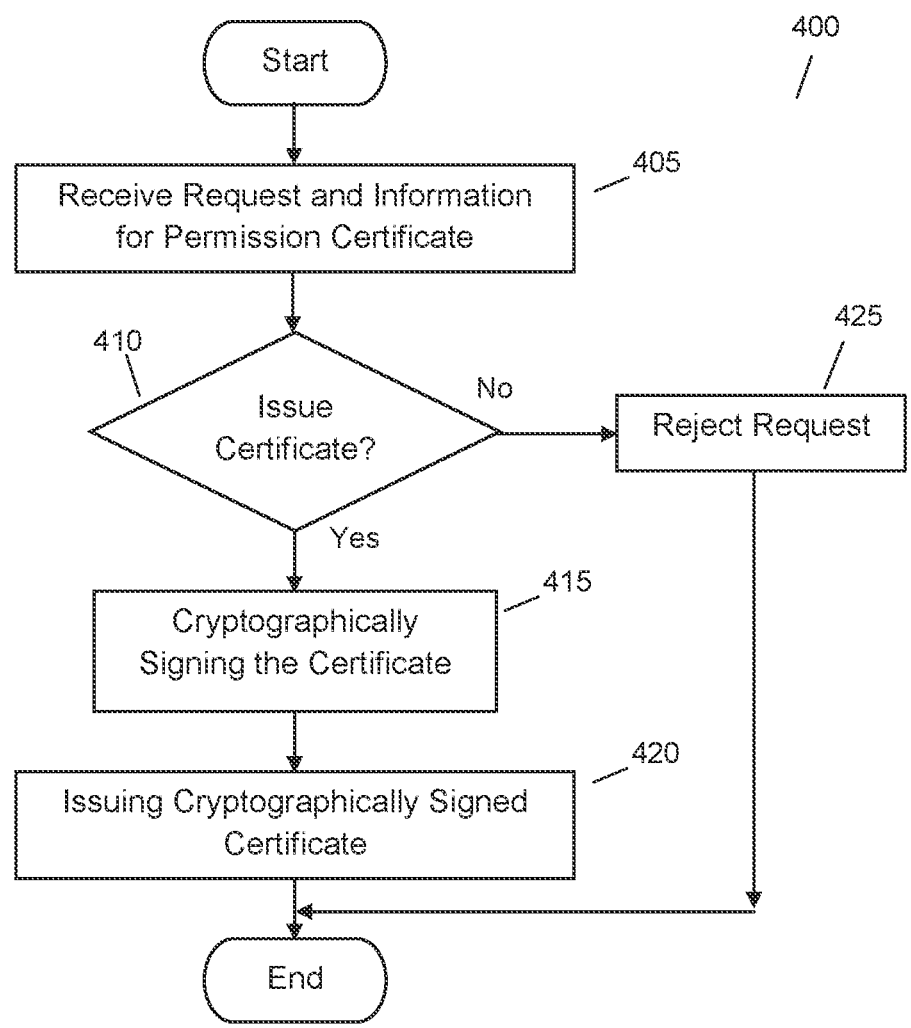
FIG. 4 illustrating a flow diagram of a process for issuing a permission certificate to an application package in accordance with an embodiment of the invention.

FIG. 4 illustrates process 400 that is performed by modules in a server associated with a manufacturer of the device a computer system to issue a permission certificate for an APK. Process 400 begins at step 405 when the server receives a request from an APK developer for the issuance of a permission certificate. Contained within the request will be the application's development public key, the application's package name and the permissions that are required by the application. Process 400 will then assess the received request and will determine at step 410 whether a permission certificate is to be issued. If process 400 determines that the request is to be rejected and a permission certificate is not to be issued, process 400 proceeds to step 425 whereby the request is rejected and process 400 ends. Alternatively, if process 400 determines at step 410 that a permission certificate is to be issued, process 400 proceeds to step 415 instead. At step 415, the permission certificate will be cryptographically signed using the device manufacturer's permission certification private key. The cryptographically signed permission certificate, which now contains the application's development public key, the application's package name, the permissions that are required by the application and the cryptographic signature, will then be issued by process 400 at step 420. Process 400 then ends.

Figure 5:
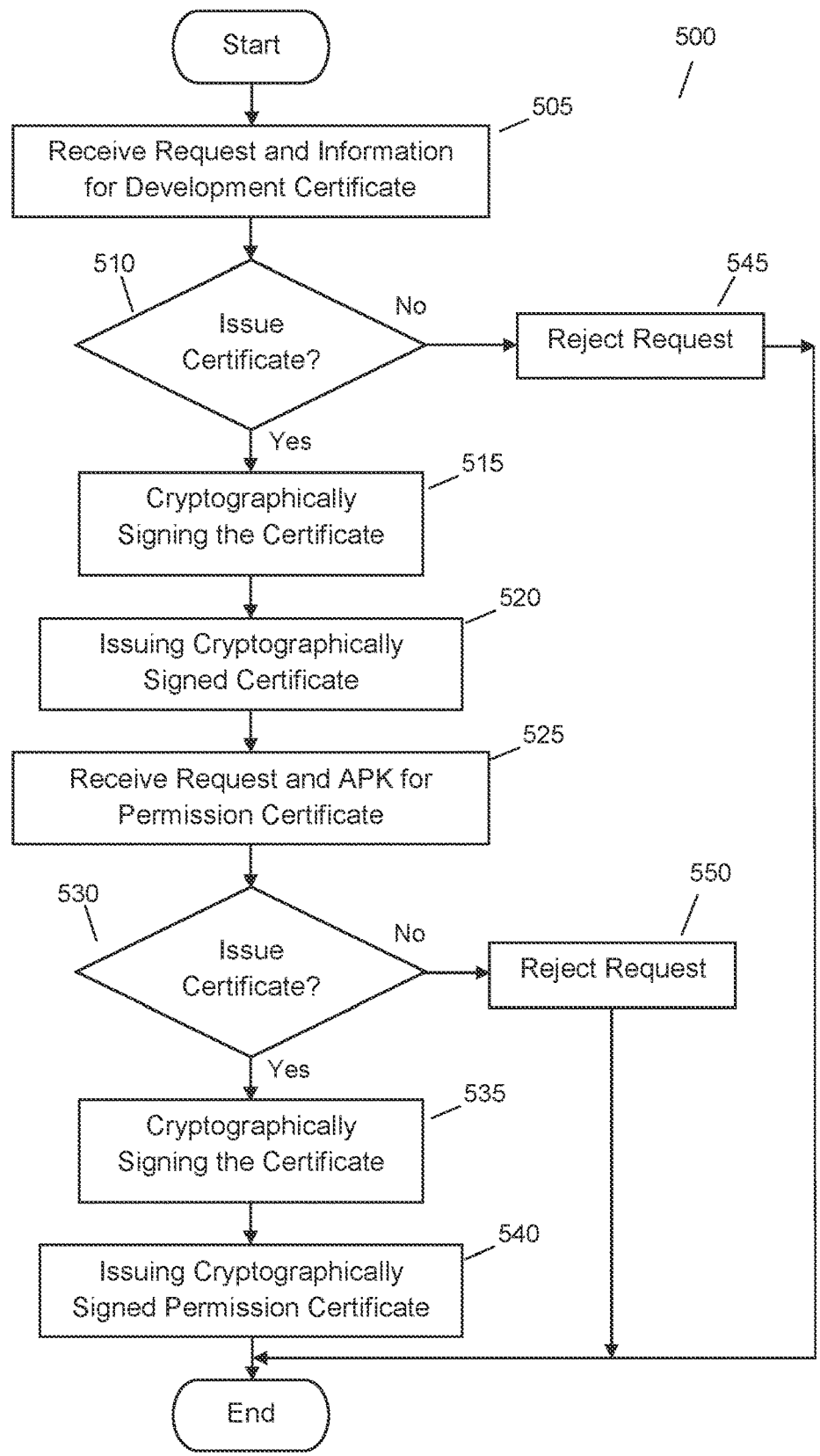
FIG. 5 illustrating a flow diagram of a process for issuing a development permission certificate followed by a permission certificate in accordance with an embodiment of the invention.

FIG. 5 illustrates process 500 that is performed by modules in a server associated with a manufacturer of the device a computer system to issue a permission certificate for an APK whereby a development permission certificate is issued by process 500 prior to the issuance of the release permission certificate. Process 500 begins at step 505 when the server receives a request from an APK developer for the issuance of a development permission certificate. Contained within the request will be the application's development public key, the application's package name, a list of device identities used during the development stage and the permissions that are required by the application. Process 500 will then assess the received request and will determine at step 510 whether a development permission certificate is to be issued. If process 500 determines that the request is to be rejected and a development permission certificate is not to be issued, process 500 proceeds to step 545 whereby the request is rejected and process 500 ends.

Alternatively, if process 500 determines at step 510 that a development permission certificate is to be issued, process 500 proceeds to step 515 instead. At step 515, the development permission certificate will be cryptographically signed using the device manufacturer's permission certification private key. The cryptographically signed development permission certificate, which now contains the application's development public key, the application's package name, the permissions that are required by the application, the list of device identities that will be used for the development of the application and the cryptographic signature, will then be issued by process 500 at step 520. Process 500 will then receive the pre-release APK together with a request for a permission certificate, or a regular permission certificate at step 525. The pre-release APK is the final APK that is produced by the application developer after the APK developer has finished testing and debugging the APK using the development permission certificate.

Process 500 will then assess the received request and audit the pre-release APK at step 530. If process 500 determines at step 530 that the request is to be rejected and a permission certificate is not to be issued, process 500 proceeds to step 550 whereby the request is rejected and process 500 ends. Alternatively, if process 500 determines at step 530 that a permission certificate is to be issued, process 500 proceeds to step 535 instead. At step 535, the issued permission certificate will be cryptographically signed using the device manufacturer's permission certification private key. The cryptographically signed permission certificate, which now contains the application's development public key, the application's package name, the permissions that are required by the application, a cryptographic hash of content of the APK and the cryptographic signature, will then be issued by process 500 at step 540. Process 500 then ends.

Figure 6:
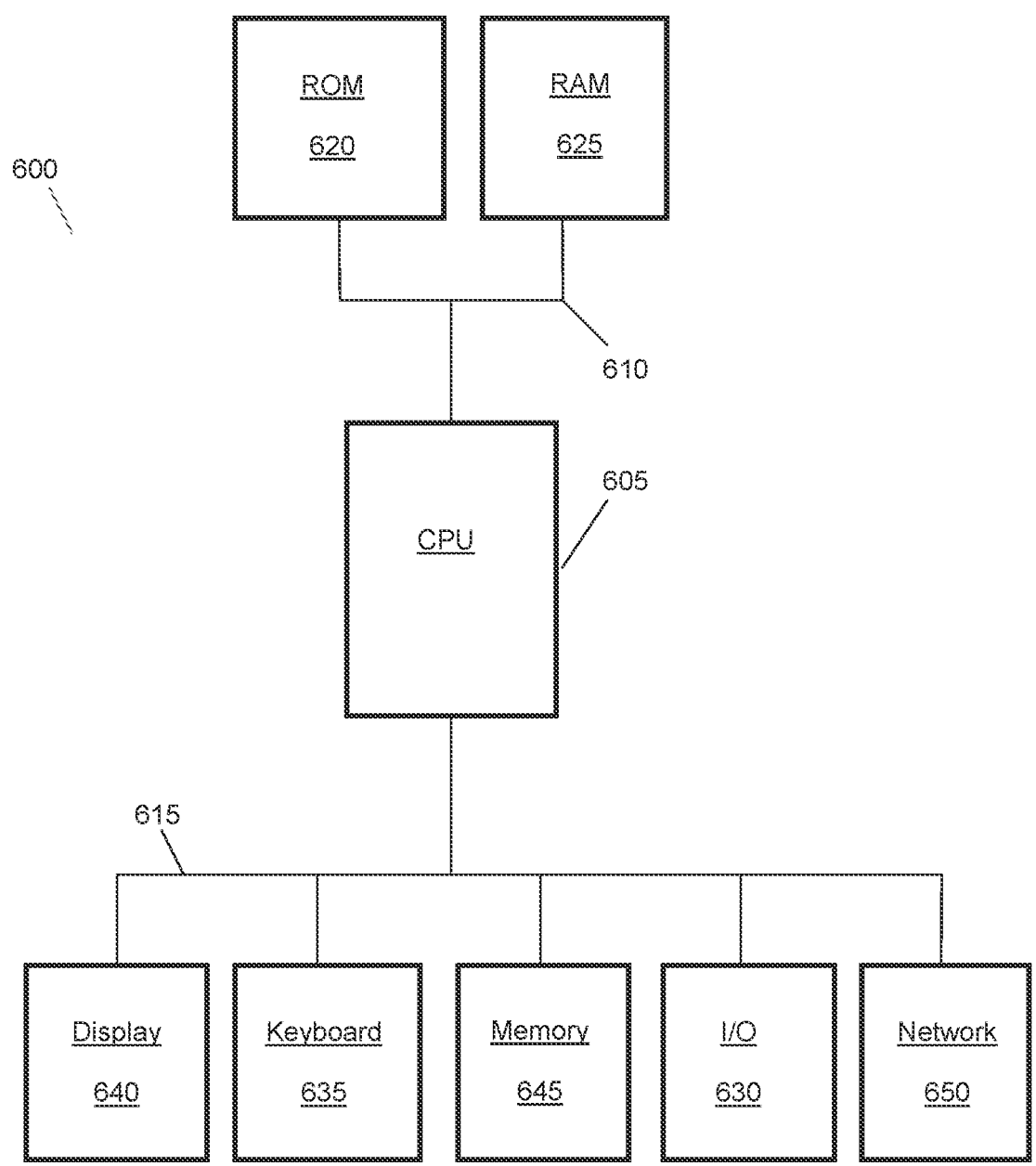
FIG. 6 illustrating a block diagram representative of processing systems providing embodiments in accordance with embodiments of the invention.

Processes provided by instructions stored in a non-transitory computer-readable media are executed by a processing unit in a computer system. For the avoidance of doubt, non-transitory computer-readable media shall be taken to comprise all computer-readable media except for a transitory, propagating signal. A computer system may be provided in one or more mobile devices and/or computer servers to provide embodiments of this invention. The instructions may be stored as firmware, hardware, or software. FIG. 6 illustrates an example of such a processing system. Processing system 600 may be the processing system in the mobile devices that execute the instructions to perform the processes for providing a method and/or system in accordance with embodiments of this invention. One skilled in the art will recognize that the exact configuration of each processing system may be different and the exact configuration of the processing system in each mobile device may vary and FIG. 6 is given by way of example only.

Processing system 600 includes Central Processing Unit (CPU) 605. The CPU 605 is a processor, microprocessor, or any combination of processors and microprocessors that execute instructions to perform the processes in accordance with embodiments of the present invention. CPU 605 connects to memory bus 610 and Input/Output (I/O) bus 615. Memory bus 610 connects CPU 605 to memories 620 and 625 to transmit data and instructions between memories 620, 625 and CPU 605. I/O bus 615 connects CPU 1105 to peripheral devices to transmit data between CPU 605 and the peripheral devices. One skilled in the art will recognize that I/O bus 615 and memory bus 610 may be combined into one bus or subdivided into many other busses and the exact configuration is left to those skilled in the art.

A non-volatile memory 620, such as a read only memory (ROM), is connected to memory bus 610. Non-volatile memory 620 stores instructions and data needed to operate various sub-systems of processing system 600 and to boot the system at start-up. One skilled in the art will recognize that any number of types of memory may be used to perform this function.

A volatile memory 625, such as random access memory (RAM), is also connected to memory bus 610. Volatile memory 625 stores the instructions and data needed by CPU 605 to perform software instructions for processes such as the processes required for providing a system in accordance with embodiments of this invention. One skilled in the art will recognize that any number of types of memory may be used as volatile memory and the exact type used is left as a design choice to those skilled in the art.

I/O device 630, keyboard 635, display 640, memory 645, network device 650 and any number of other peripheral devices connect to I/O bus 615 to exchange data with CPU 605 for use in applications being executed by CPU 605. I/O device 630 is any device that transmits and/or receives data from CPU 605. Keyboard 635 is a specific type of I/O that receives user input and transmits the input to CPU 605. Display 640 receives display data from CPU 605 and display images on a screen for a user to see. Memory 645 is a device that transmits and receives data to and from CPU 605 for storing data to a media. Network device 650 connects CPU 605 to a network for transmission of data to and from other processing systems.

What is claimed is:

1. A method for managing installation of an application package (APK) in a mobile device, comprising:
   receiving, by the mobile device, an installation request for installing the APK in the mobile device;
   retrieving, by the mobile device, a permission certificate for the APK according to the installation request, wherein the permission certificate for the APK comprises a cryptographic signature;
   verifying, by the mobile device, the cryptographic signature to determine validity of the permission certificate, wherein a permission certification public key is stored in the mobile device, and wherein a valid permission certificate indicates that a manufacturer of the mobile device permits the installation of the APK in the mobile device; and
   allowing, by the mobile device, installation of the APK in the mobile device based on the permission certificate being determined to be valid;
   wherein the verifying the cryptographic signature to determine the validity of the permission certificate comprises:
   computing a cryptographic hash of the APK using a cryptographic hash function; and
   comparing the cryptographic hash of the APK with another cryptographic hash of the APK stored in the permission certificate;
   wherein the cryptographic signature is generated at a server associated with the manufacturer of the mobile device based on a permission certification private key of the manufacturer of the mobile device being used to cryptographically sign the permission certificate for the APK; and
   wherein the cryptographically signed permission certificate for the APK comprises: a development public key of the APK, a name of the APK, permission or permissions granted to the APK, and a validity period of the permission certificate.

2. The method according to claim 1, wherein before the allowing installation of the APK in the mobile device, the method further comprises:
   determining, by the mobile device, whether a permission request contained in the installation request corresponds to a permission granted in the permission certificate for the APK; and
   validating, by the mobile device, the permission certificate based on it being determined that the permission request contained in the installation request corresponds to the permission granted in the permission certificate.

3. The method according to claim 1, wherein the permission certificate for the APK is cryptographically signed after the server receives a pre-release APK that contains a development permission certificate that has been cryptographically signed using the permission certification private key of the manufacturer of the mobile device, and wherein the development permission certificate allows the pre-release APK to be installed in a predetermined development device.

4. The method according to claim 1, wherein retrieving the permission certificate for the APK comprises de-embedding the permission certificate from the APK.

5. The method according to claim 1, wherein retrieving the permission certificate for the APK comprises downloading the permission certificate from a server to the mobile device.

6. The method according to claim 1, wherein the APK is an Android™ application package.

7. A mobile device, comprising:
   a processor, and
   a non-transitory storage medium storing instructions readable by the processor;
   wherein the processor executes the instructions to cause the mobile device to:
   receive an installation request for installing an application package (APK) in the mobile device;
   retrieve a permission certificate for the APK according to the installation request, wherein the permission certificate for the APK comprises a cryptographic signature;
   verify the cryptographic signature using a permission certification public key of a manufacturer of the mobile device to determine validity of the permission certificate, wherein the permission certification public key is stored in the mobile device, and wherein a valid permission certificate indicates that the manufacturer of the mobile device permits the installation of the APK in the mobile device; and
   allow the installation of the APK in the mobile device based on the permission certificate being determined to be valid;
   wherein in verifying the cryptographic signature to determine the validity of the permission certificate, the instructions cause the mobile device to:
   compute a cryptographic hash of the APK using a cryptographic hash function; and
   compare the cryptographic hash of the APK with another cryptographic hash of the APK stored in the permission certificate;
   wherein the cryptographic signature included in the permission certificate is generated at a server associated with the manufacturer of the mobile device based on a permission certification private key of the manufacturer of the mobile device being used to cryptographically sign the permission certificate for the APK; and
   wherein the cryptographically signed permission certificate for the APK comprises: a development public key of the APK, a name of the APK, permission or permissions granted to the APK, and a validity period of the permission certificate.

8. The mobile device according to claim 7, wherein the instructions further cause the mobile device to:
   before allowing the installation of the APK in the mobile device, determine whether a permission request contained in the installation request corresponds to a permission granted in the permission certificate for the APK; and
   validate the permission certificate when it is determined that the permission request contained in the installation request corresponds to the permission granted in the permission certificate.

9. The mobile device according to claim 7, wherein the permission certificate for the APK is cryptographically signed after the server receives a pre-release APK that contains a development permission certificate that has been cryptographically signed using the permission certification private key of the manufacturer of the mobile device, and wherein the development permission certificate allows the pre-release APK to be installed in a predetermined development device.

10. The mobile device according to claim 7, wherein the instructions to retrieve the permission certificate for the APK comprises instructions to de-embed the permission certificate from the APK.

11. The mobile device according to claim 7, wherein the instructions to retrieve the permission certificate for the APK comprises instructions to download the permission certificate from a remote server to the mobile device.

12. The mobile device according to claim 7, wherein the APK is an Android™ application package.

* * * * *

UNITED STATES PATENT AND TRADEMARK OFFICE
CERTIFICATE OF CORRECTION

PATENT NO.         : 11,637,707 B2
APPLICATION NO.    : 17/112750
DATED              : April 25, 2023
INVENTOR(S)        : Wu et al.

Page 1 of 1

It is certified that error appears in the above-identified patent and that said Letters Patent is hereby corrected as shown below:

On the Title Page

Item (30), should be added:
-- Foreign Application Priority Data
Nov. 6, 2015 (SG) .......................... 10201509221Y --.

Signed and Sealed this
Twenty-fourth Day of September, 2024

Katherine Kelly Vidal
*Director of the United States Patent and Trademark Office*